(12) United States Patent
Cotta

(10) Patent No.: US 9,843,592 B2
(45) Date of Patent: Dec. 12, 2017

(54) FAST MULTICAST MESSAGING ENCRYPTION AND AUTHENTICATION

(71) Applicant: Sony Computer Entertainment America LLC, San Mateo, CA (US)

(72) Inventor: Bryan Cotta, San Mateo, CA (US)

(73) Assignee: SONY INTERACTIVE ENTERTAINMENT AMERICA LLC, San Mateo, CA (US)

(*) Notice: Subject to any disclaimer, the term of this patent is extended or adjusted under 35 U.S.C. 154(b) by 196 days.

(21) Appl. No.: 14/882,651

(22) Filed: Oct. 14, 2015

(65) Prior Publication Data
US 2017/0111371 A1   Apr. 20, 2017

(51) Int. Cl.
H04L 29/06 (2006.01)

(52) U.S. Cl.
CPC .......... *H04L 63/123* (2013.01); *H04L 63/061* (2013.01); *H04L 63/0876* (2013.01)

(58) Field of Classification Search
CPC .. H04L 63/123; H04L 63/061; H04L 63/0876
USPC ....................................................... 713/163
See application file for complete search history.

(56) References Cited

U.S. PATENT DOCUMENTS

| 4,956,863 | A | 9/1990 | Goss |
| 5,299,263 | A | 3/1994 | Beller et al. |
| 5,454,039 | A | 9/1995 | Coppersmith et al. |
| 7,499,551 | B1 | 3/2009 | Mire |
| 2002/0080958 | A1 | 6/2002 | Ober et al. |
| 2005/0021479 | A1 | 1/2005 | Jorba et al. |
| 2009/0249073 | A1 | 10/2009 | Wiseman et al. |
| 2012/0254959 | A1* | 10/2012 | Schmidt ................ H04L 63/061 726/6 |
| 2013/0051551 | A1 | 2/2013 | Aimani |

\* cited by examiner

*Primary Examiner* — Anthony Brown
(74) *Attorney, Agent, or Firm* — John L. Rogitz

(57) ABSTRACT

To prevent legitimate message recipients from forging new messages and to encrypt messages for a specific set of recipients (channel), a root key is encrypted and combined with a base session management key to render a combined root key, which in turn is encrypted with a public key of at least one recipient device to render a session management key. The public key of each of "N" intended recipient device encrypts the combined root key to render "N" session management keys. The session management keys are then combined with the combined root key to render a multicast root key, which is signed with a private key of a sending device. The signed multicast root key is combined with the session management keys to render an encrypted, signed multicast root key that is used to encrypt digital information prior to transmitting the digital information.

20 Claims, 6 Drawing Sheets

FAST MULTICAST MESSAGING ENCRYPTION AND AUTHENTICATION

TECHNICAL FIELD

The application relates generally to fast multicast messaging encryption and authentication.

BACKGROUND

Digital message broker systems (e.g., Pivotal RabbitMQ, Apache ActiveMQ, Apache Kafka) allow for efficient distribution of messages from sender or senders to receiver or receivers. However, the message distribution systems do little or nothing to provide authentication or authorization on a consumer-by-consumer basis. Additionally, other security mechanisms typically neglect fast anti-forgery: the desire that legitimate recipients cannot forge new messages to the rest of the group.

SUMMARY

Accordingly, present principles allow for easy and fast encryption and authentication of messages, as well as a fast key distribution mechanism that is agnostic of the message broker system and that can be applied to multiple technology types.

As detailed further below, a sender is able to establish a broadcast channel specific to a set of recipients. That is, the sender is able to encrypt and/or sign messages for certain recipients, broadcast and distribute that message to all recipients via any message broker system, but only the intended recipients can decrypt the message. Additional recipients can be added easily to a channel without affecting (re-keying) the existing recipients.

Accordingly, in one aspect a sender device includes a computer memory that is not a transitory signal and that in turn includes instructions executable by a processor to access a root key and encrypt the root key with a root session management key (RSMK) to render an encrypted root key. Further, the RSMK is encrypted with a public key of at least a first recipient device, to render a first device session management key (DSMK), which is concatenated with the encrypted root key to render a concatenation. The instructions are executable to sign the concatenation to render a signed root key blob and to distribute the signed root key blob to at least the first receiver for use in securely exchanging digital information.

In some implementations of this aspect, N recipient devices are intended to receive the digital information, and N DSMKs are rendered by encrypting the RSMK once with each respective one of N public keys of the respective N recipient devices. The N DSMKs are combined with the encrypted root key to render the concatenation. The RSMK may be derived from a pseudorandom number. The concatenation may further include an initialization vector (IV).

In example embodiments, the instructions can be executable to send a message encrypted at least in part using the root key to render an encrypted message. In such embodiments, the instructions may be executable to encrypt the message using a multicast (MC) session key that is derived from a pseudorandom message key offset and the root key and that is different from the RSMK. In a specific implementation, the message key offset is XORed with the root key to establish the MC session key.

Additional non-limiting embodiments include instructions executable to generate a message header including at least the message key offset and a message initialization vector (IV). A private key-based signature of the sender device can be with the message header to render a signed header, and the encrypted message concatenated with the signed header. The encrypted message with the signed header is sent to the recipient devices.

In another aspect, a receiver device includes a computer memory that is not a transitory signal and that in turn instructions executable by a processor to receive a root key blob. The instructions can be executed by the processor to parse through elements of the root key blob to extract an encrypted session management key unique to the receiver device, and to decrypt the encrypted session management key using a private key of the receiver device to render a decrypted session management key. The instructions are further executable to use the decrypted session management key to decrypt an encrypted multicast root key in the root key blob to render a decrypted multicast root key. The decrypted multicast root key is used by the receiver device to process a message.

In example implementations of this aspect, the instructions can be executable to access a public key of a sender device from which the root key blob is received and validate a signature of the root key blob using the public key. Responsive to the signature being valid, the parsing through the elements of the root key blob is conducted, whereas if the signature is not found to be valid, the parsing through the elements is not executed.

Once the receiver device has the decrypted multicast root key, in example embodiments the instructions can be executable to receive an encrypted message with a header and to extract a multicast (MC) session key using the decrypted multicast root key and a message key offset in the header. Here, the MC session key can be different from the session management key. The receiver device may decrypt the encrypted message using the MC session key.

In some embodiments, the instructions can be executable to validate a signature of the header using the public key of the sender device. Responsive to the signature of the header being valid, the MC session key is extracted, whereas if the signature is not valid, the receiver device does not attempt to extract the MC session key.

In another aspect, a computerized method includes asymmetrically encrypting a root session management key (RSMK) with each of "N" public keys of "N" recipient devices with to render "N" respective device session management keys (DSMK), in which each DSMK is the product of encrypting the RSMK with a single public key. The method includes symmetrically encrypting a multicast (MC) root key with the RSMK to render an encrypted MC root key and generating a key blob containing the encrypted MC root key and the N DSMKs, with the key blob being distributed to the recipient devices.

Subsequently, the method includes symmetrically encrypting a message using a MC session key to render an encrypted message. The MC session key is derived from the MC root key and a pseudorandom element and is different from both the MC root key and the RSMK. The encrypted message is sent to the recipient devices with a message header that includes the pseudorandom element used in deriving the MC session key.

The details of the present application, both as to its structure and operation, can best be understood in reference to the accompanying drawings, in which like reference numerals refer to like parts, and in which:

DETAILED DESCRIPTION

Figure 1:
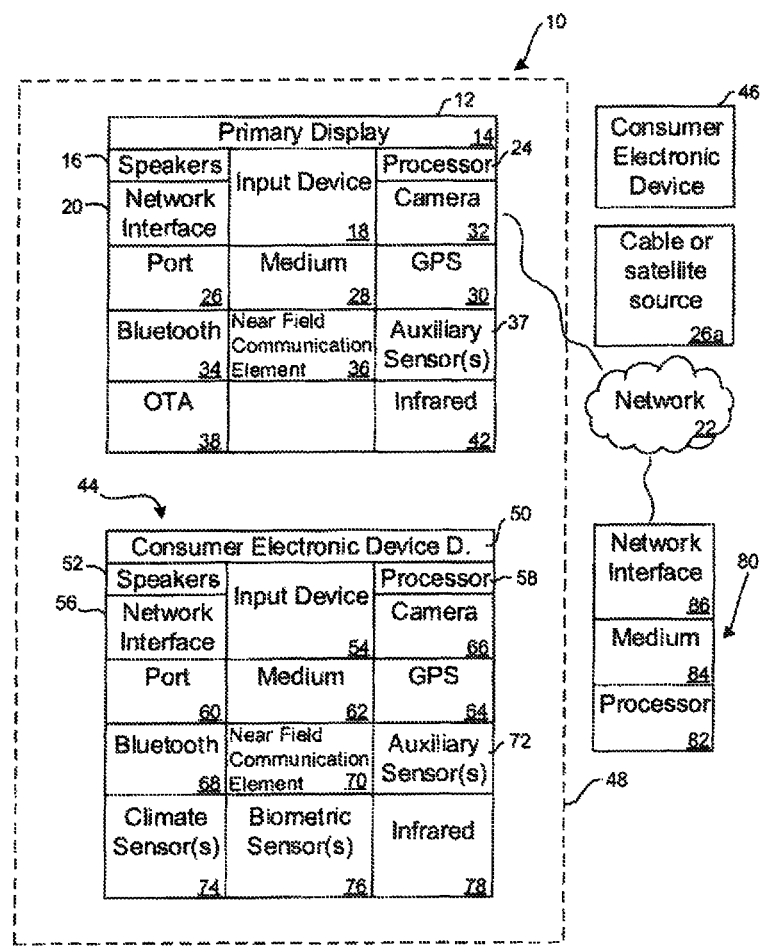
FIG. 1 is a block diagram of an example system including an example in accordance with present principles.

This disclosure relates generally to computer ecosystems including aspects of consumer electronics (CE) device networks such as but not limited to distributed computer game networks. A system herein may include server and client components, connected over a network such that data may be exchanged between the client and server components. The client components may include one or more computing devices including game consoles such as Sony Playstation™, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers ma employ, as examples, Orbis or Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV web a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTH TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used. As alluded to above, the CE device 44/46 and/or the source 26a may be implemented by a game console. Or, one or more of the CE devices 44/46 may be implemented by devices sold under the trademarks Google Chromecast, Roku, Amazon FireTV.

In the example shown, to illustrate present principles all three devices 12, 44, 46 are assumed to be members of an entertainment network in, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVD 12, or it may be a more sophisticated device such as a tablet computer, a game controller communicating via wired or wireless link with a game console implemented by the second CE device 46 and controlling video game presentation on the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver. Typically, the server 80 includes multiple processors in multiple computers referred to as "blades".

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or is a download over the internet.

Figure 2:
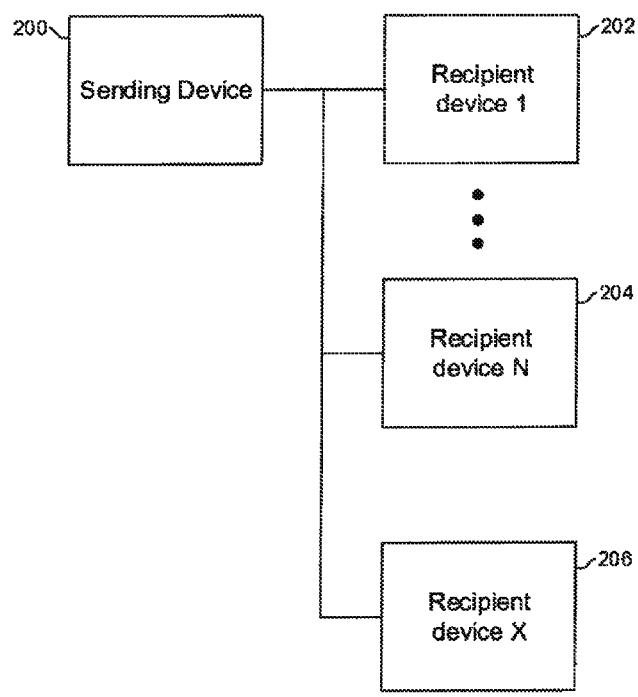
FIG. 2 is a schematic diagram of a sending device using present encryption principles to send a message to intended recipient devices 1-N but not to recipient device X.

FIG. 2 shows an example system in which a message sending device 200 communicates with recipient devices 1-N 202, 204 and with a recipient device X 206. Present principles enable the sending device 200 to broadcast a message to all recipient devices 202, 204, 206 but configure the message such that only the "N" intended recipient devices 202, 204 but not the recipient device 206 can decrypt and read the message. Note that "N" can be an integer greater than one. Note further that the devices 200-206 shown in FIG. 2 can be implemented by any of the devices disclosed above incorporating some or all of the relevant components of a device disclosed above.

Figure 3:
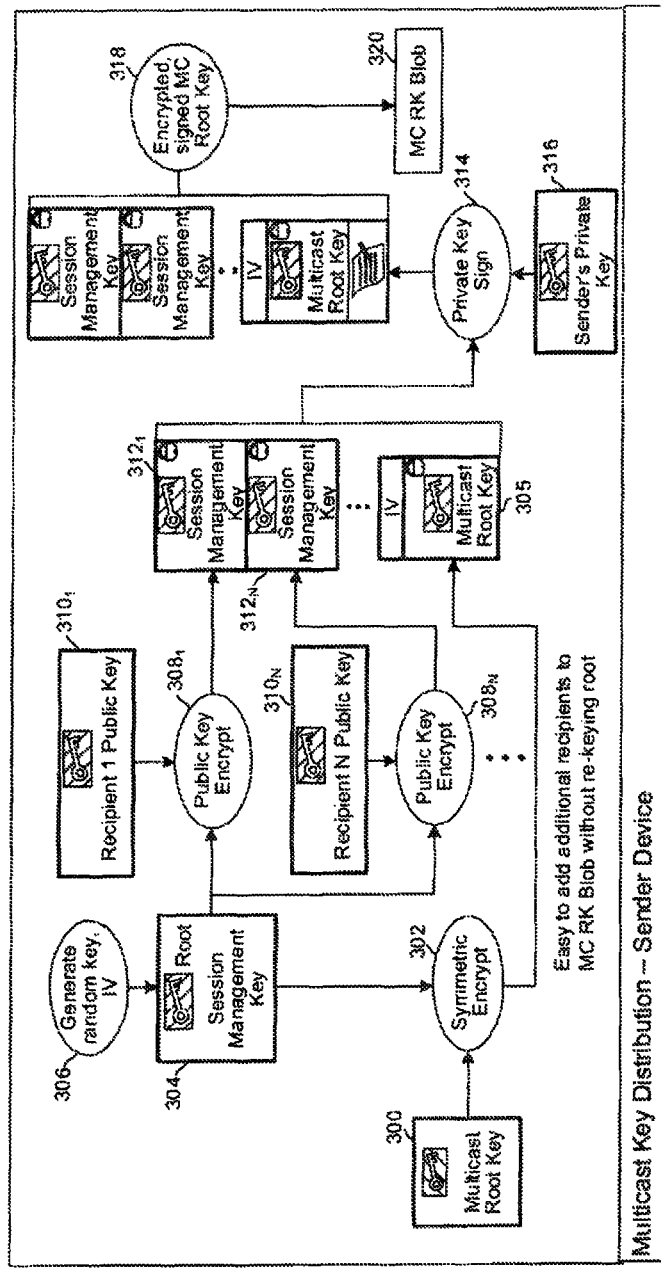
FIG. 3 is a schematic diagram illustrating a sender's multicast key generation and distribution to essentially establish a multicast channel.

Now referring to FIG. 3, a multicast root key 300, which may be a pseudorandomly generated string, is encrypted 302 by, e.g., symmetric encryption with a root session management key (RSMK) 304 to render an encrypted multicast root key 305. As indicated at 306, the RSMK 304 can be (or can be derived from) a pseudorandomly generated key with an initialization vector (IV).

The RSMK 304 is then encrypted at $308_1, \ldots 308_N$ with respective public keys $310_1, \ldots 310_N$ of "N" respective intended recipient devices to produce respective "N" device session management keys (DSMK) $312_1, \ldots 312_N$. That is, the RSMK 304 is encrypted once with the public key $310_1$ of the first intended recipient device to produce the first $DSMK_1$, and is encrypted once with each respective successive public key until "N" DSMKs 312 are generated. The public keys of the intended recipient devices may be provided to the sender device by a server or person or other agent who has determined which devices in a potentially large multicast or broadcast pool should be intended recipient devices for purposes herein.

As shown in FIG. 3, once the N DSMKs are generated, they are combined, as by concatenation, with the (encrypted) multicast root key 305 and IV, and the combined keys signed as one "blob" at 314 with the private key 316 of the sender device. This results in an encrypted, signed multicast root key 318 as shown, which is distributed to the "N" recipient devices as a multicast root key blob 320 for purposes to be shortly disclosed. Thus, at 314 two inputs are received, namely, the "blob" to sign and the sender's private key, and one output is provided, namely, the signed "blob" at 318, with the "blob" elements being shown for specificity just to the left of the element 318 in FIG. 3.

Note that the algorithm shown in FIG. 3 renders it relatively easy to add additional recipient devices to the blob 320 without having to re-key the multicast root key 300.

Figure 4:
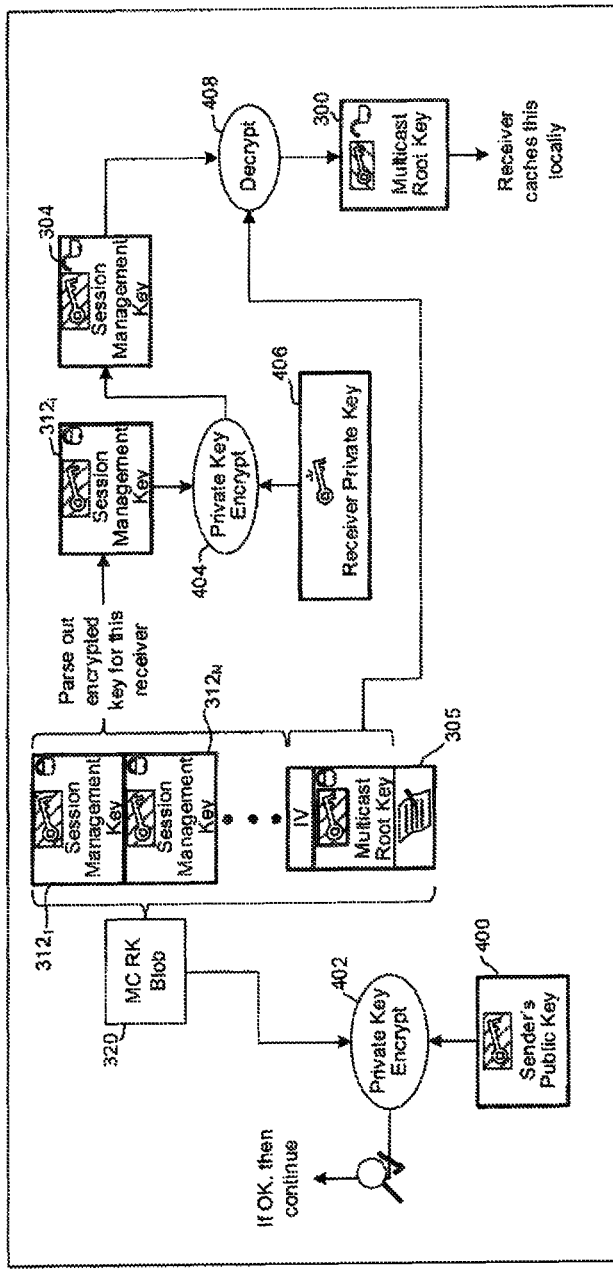
FIG. 4 is a schematic diagram illustrating a receiver's role in establishing the multicast channel.

Once the encrypted, signed multicast root key blob 320 is distributed to establish a multicast channel. Distribution potentially may be through a broadcast to both intended recipients and to recipient devices not intended to read a particular message and thus not contributing recipient public keys in FIG. 3. FIG. 4 illustrates a receiver's action to subscribe to the multicast channel.

The receiver first obtain the public key 400 of the sender/publisher and at 402 validates the signature of the MC root key blob 320 using the public key 400. If the signature is not validated the process ends. If the signature is valid, the receiver parses through the aforementioned concatenated elements 305, IV, and $312_{1, \ldots N}$ of the blob as indicated in FIG. 4 to extract the encrypted session management key $312_1$ that belongs to this receiver/subscriber. The correct session management key may be identified by the sender simply appending the identification of the respective receiver to each session management key or by the receiver simply attempting to decrypt all the session management keys in the blob and extracting the key that was successfully decrypted.

In any case, the encrypted session management key $312_1$ of the receiver executing the process in FIG. 4 is decrypted at 404 using the private key 406 of this receiver/subscriber. The decrypted session management key 304 is then used at 408 to decrypt the encrypted multicast root key 305 in the blob to render the original decrypted multicast root key 300. If desired, the root key 300 may be cached in receiver memory to avoid repeated parsings the blob.

Figure 5:
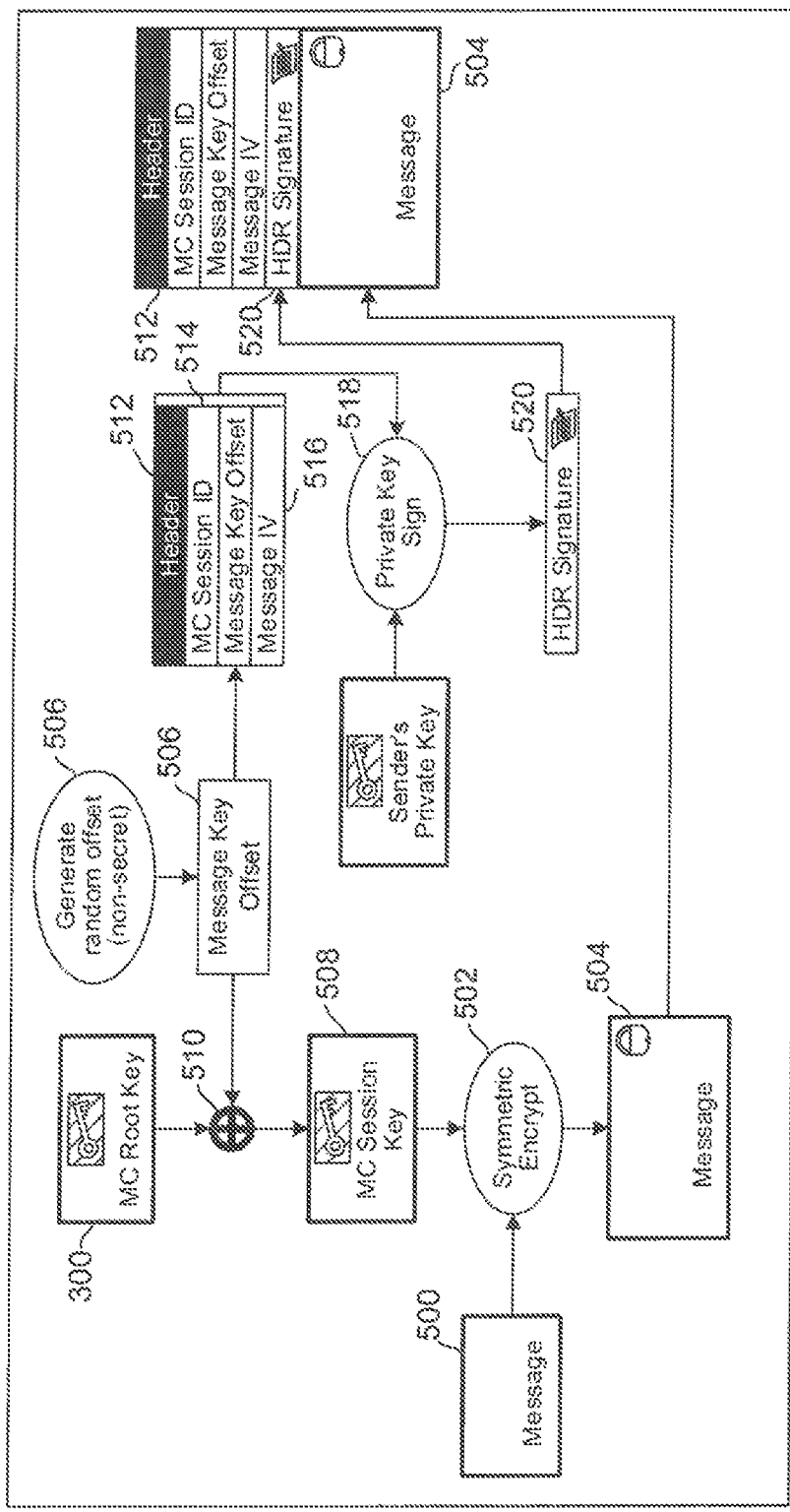
FIG. 5 is a schematic diagram illustrating message broadcast over the multicast channel established in FIGS. 3 and 4.
Figure 6:
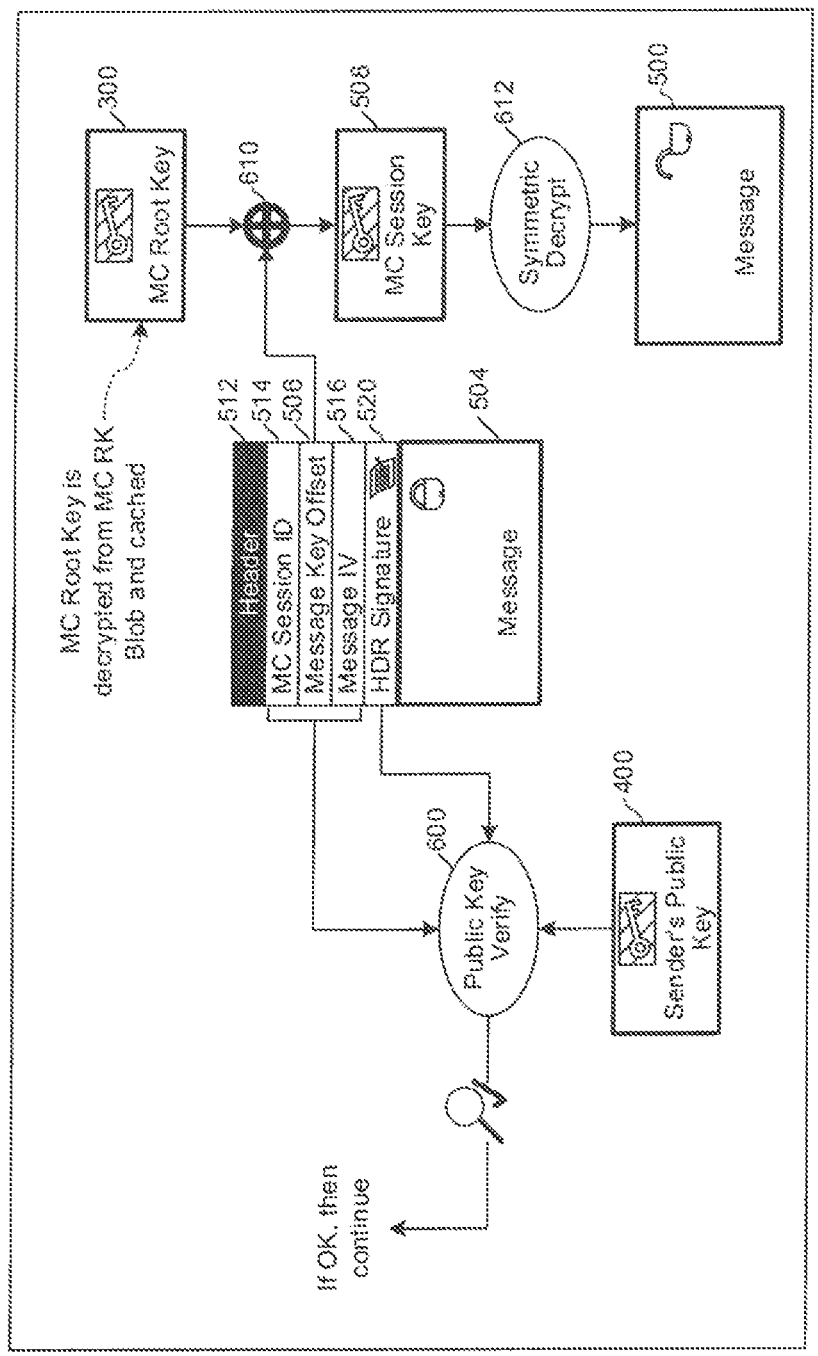
FIG. 6 is a schematic diagram illustrating message processing by an intended recipient.

Once the multicast channel has been established according to FIGS. 3 and 4, it may be used according to FIGS. 5 and 6 to broadcast a message that can be read only by the receivers selected by the sender in FIG. 3 to be channel subscribers, although the broadcast may be received (but the message is not readable) by other receivers.

A message 500 is generated and then symmetrically encrypted at 502 to render an encrypted message 504. In addition to the message 500, the other input to the operation at 502 is described as follows.

A non-secret pseudorandom offset is generated at 506 for the message 500. A multicast (MC) session key 508 is computed at 510 as follows: the MC session key 508=the multicast root key 300 combined (as by an XOR operation) with the message key offset 506. It may now be appreciated that the MC session key 508 is used at 502 to encrypt the message 500, producing the encrypted message 504.

Furthermore, a message header 512 is generated which contains the message key offset 506, a MC session ID 514 (an identification of the message MC session pertaining to the message 500), and a message initialization vector (IV) 516. The header is signed at 518 with the private key of sender/publisher to render a header signature 520.

The encrypted message 504 is then concatenated with the header 512 and header signature 520 as shown on the right of FIG. 5 and broadcast.

Additional receivers can be added at a later time by simply repeating the sender's and receiver's one-time setup actions using the same Multicast Root Key. The Session Management Key is ephemeral and may be regenerated for late-coming receivers.

FIG. 6 illustrates the operations executed by one of the receivers shown in FIG. 2 upon receiving an encrypted message 504 with header 512 and header signature 520. At 600 the header signature 520 is verified with the public key 400 of the sender/publisher. If verification fails the process ends.

Otherwise, if verification succeeds, the MC session key 508 is computed at 610 as follows. The MC session key is derived by decombining the MC root key 300 (as by reverse XOR when XOR is used in FIG. 5) with the message key offset 506. Once the MC session key 508 is thus rendered, it is used at 612 to symmetrically decrypt the encrypted message 504 to render the message 500 in the clear.

No one, including valid receivers/subscribers can forge a new message to other receivers/subscribers because the header of the message is signed with the private key of the sender/publisher. Only the sender has this private key. Other receivers/subscribers must verify the header with the corresponding public key of the sender/publisher before attempting to decrypt the message.

It may now be appreciated that present principles can be used for any message brokering system or technology, and provide fast anti-forgery, in that legitimate recipients cannot forge new messages for the channel. Encryption of messages for a specific set of recipients (channel) is provided, and additional recipients are easily added to a channel without re-keying existing channel or recipients. The use of fast symmetric cryptography for all channel traffic is used so that slower asymmetric cryptography need only be used to initially establish the channel. Also, the disclosed message encryption key derivation is resistant to crypto and side-channel attacks.

It will be appreciated that whilst present principals have been described with reference to some example embodiments, these are not intended to be limiting, and that various alternative arrangements may be used to implement the subject matter claimed herein.

What is claimed is:

1. A sender device comprising:
    at least one computer memory that is not a transitory signal and that comprises instructions executable by at least one processor to:
    access a root key;
    encrypt the root key with a root session management key (RSMK) to render an encrypted root key;
    encrypt the RSMK with a public key of at least a first recipient device to render a first device session management key (DSMK);
    concatenate the first DSMK and the encrypted root key to render a concatenation;
    sign the concatenation to render a signed root key blob; and
    distribute the signed root key blob to at least the first receiver for use in securely exchanging digital information at least in part by using the sender device to transmit the signed root key blob to the first receiver.

2. The sender device of claim 1, wherein N recipient devices are intended to receive the digital information, and N DSMKs are rendered by encrypting the RSMK once with each respective one of N public keys of the respective N recipient devices, the N DSMKs being combined with the encrypted root key to render the concatenation.

3. The sender device of claim 1, comprising the at least one processor coupled to the at least one computer memory.

4. The sender device of claim 1, wherein the RSMK is derived from a pseudorandom number.

5. The sender device of claim 1, wherein the concatenation further includes an initialization vector (IV).

6. The sender device of claim 1, wherein the instructions are executable to:
send a message encrypted at least in part using the root key to render an encrypted message.

7. The sender device of claim 6, wherein the instructions are executable to:
encrypt the message using a multicast (MC) session key, the MC session key being derived from a pseudorandom message key offset and the root key and being different from the RSMK.

8. The sender device of claim 7, wherein the message key offset is XORed with the root key to establish the MC session key.

9. The sender device of claim 6, wherein the instructions are executable to:
generate a message header including at least the message key offset and a message initialization vector (IV);
combine a private key-based signature of the sender device with the message header to render a signed header;
concatenate the encrypted message with the signed header; and
send the encrypted message with the signed header.

10. A receiver device comprising:
at least one computer memory that is not a transitory signal and that comprises instructions executable by at least one processor to:
receive from a sender device a root key blob;
parse through elements of the root key blob to extract an encrypted session management key unique to the receiver device;
decrypt the encrypted session management key using a private key of the receiver device to render a decrypted session management key;
use the decrypted session management key to decrypt an encrypted multicast root key in the root key blob to render a decrypted multicast root key; and
use the decrypted multicast root key to process at least one message.

11. The receiver device of claim 10, wherein the instructions are executable to:
access a public key of the sender device from which the root key blob is received;
validate a signature of the root key blob using the public key;
responsive to the signature being valid, parse through elements of the root key blob to extract the encrypted session management key; and
responsive to the signature not being valid, not parsing through elements of the root key blob to extract the encrypted session management key.

12. The receiver device of claim 10, comprising the at least one processor coupled to the at least one computer memory.

13. The receiver device of claim 10, wherein the instructions are executable to:
receive an encrypted message with a header;
extract a multicast (MC) session key using the decrypted multicast root key and a message key offset in the header, the MC session key being different from the session management key; and
decrypt the encrypted message using the MC session key.

14. The receiver device of claim 13, wherein the instructions are executable to:
validate a signature of the header using the public key of the sender device;
responsive to the signature of the header being valid, extract the MC session key using the decrypted multicast root key and the message key offset in the header; and
responsive to the signature not being valid, not extract the MC session key using the decrypted multicast root key and the message key offset in the header.

15. A computerized method comprising:
asymmetrically encrypting a root session management key (RSMK) with each of "N" public keys of "N" recipient devices with to render "N" respective device session management keys (DSMK), in which each DSMK is the product of encrypting the RSMK with a single public key;
symmetrically encrypting a multicast (MC) root key with the RSMK to render an encrypted MC root key;
generating a key blob containing at least the encrypted MC root key and the N DSMKs;
distributing the key blob to the recipient devices;
symmetrically encrypting a message using a MC session key to render an encrypted message, the MC session key being derived from the MC root key and a pseudorandom element and being different from the MC root key and the RSMK; and
sending the encrypted message with a message header, the message header including at least the pseudorandom element used in deriving the MC session key.

16. The method of claim 15, comprising signing the key blob using a private key.

17. The method of claim 15, comprising signing the header using the private key.

18. The method of claim 15, wherein the header includes at least a message session identification.

19. The method of claim 15, wherein the header includes at least a message initialization vector (IV).

20. The method of claim 15, comprising broadcasting the message to the N recipient devices and to an $N^{th}+1$ recipient device with a public key not used to render one of the DSMKs, such that the $N^{th}+1$ recipient device cannot decrypt the message.

* * * * *